(12) United States Patent
Sasaki et al.

(10) Patent No.: US 11,085,593 B2
(45) Date of Patent: Aug. 10, 2021

(54) DISPLAY DEVICE

(71) Applicant: Panasonic Intellectual Property Management Co., Ltd., Osaka (JP)

(72) Inventors: Akihiko Sasaki, Osaka (JP); Mitsuhiro Namikoshi, Osaka (JP); Ryouta Nakayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/491,445

(22) PCT Filed: Mar. 19, 2018

(86) PCT No.: PCT/JP2018/010677
§ 371 (c)(1),
(2) Date: Sep. 5, 2019

(87) PCT Pub. No.: WO2018/180653
PCT Pub. Date: Oct. 4, 2018

(65) Prior Publication Data
US 2020/0032970 A1 Jan. 30, 2020

(30) Foreign Application Priority Data

Mar. 30, 2017 (JP) .............................. JP2017-067854

(51) Int. Cl.
*F21S 2/00* (2016.01)
*G02F 1/1333* (2006.01)
*G02F 1/1335* (2006.01)

(52) U.S. Cl.
CPC ............ *F21S 2/005* (2013.01); *G02F 1/1335* (2013.01); *G02F 1/133308* (2013.01)

(58) Field of Classification Search
None
See application file for complete search history.

(56) References Cited

U.S. PATENT DOCUMENTS 6,480,248 B1 * 11/2002 Lee ..................... G02F 1/13362
349/103
6,950,154 B2 * 9/2005 Lee ..................... G02B 6/0088
349/58

(Continued)

FOREIGN PATENT DOCUMENTS

JP 2002-196312 7/2002
JP 2010-026410 2/2010

(Continued)

OTHER PUBLICATIONS

International Search Report of PCT application No. PCT/JP2018/010677 dated Jun. 19, 2018.

(Continued)

*Primary Examiner* — Edward J Glick
*Assistant Examiner* — David Y Chung
(74) *Attorney, Agent, or Firm* — McDermott Will & Emery LLP (57) ABSTRACT

A display device includes: a display panel; a backlight that emits light toward a rear face of the display panel; a first optical sheet disposed between the display panel and the backlight; a second optical sheet disposed between the first optical sheet and the backlight; and a supporting member that supports an outer peripheral part of the first optical sheet. The first optical sheet includes a first sheet main body portion, and a first supporting piece that protrudes to a side direction from an outer peripheral part of the first sheet main body portion and is supported by the supporting member. The second optical sheet includes a second sheet main body portion, and a flat portion that is formed into a flat shape in an outer peripheral part of the second sheet main body portion and is disposed so as to correspond to the first supporting piece.

5 Claims, 7 Drawing Sheets

(56) References Cited

U.S. PATENT DOCUMENTS

| | | | |
|---|---|---|---|
| 8,111,351 B2* | 2/2012 | Cho | G02F 1/133608 |
| | | | 349/62 |
| 8,931,946 B2* | 1/2015 | Shin | G06K 19/06 |
| | | | 362/633 |
| 2002/0080298 A1 | 6/2002 | Fukayama | |
| 2010/0020265 A1 | 1/2010 | Senoue et al. | |
| 2012/0026427 A1 | 2/2012 | Okada et al. | |
| 2014/0055983 A1 | 2/2014 | Min et al. | |
| 2014/0340875 A1 | 11/2014 | Hayashi | |
| 2014/0347844 A1 | 11/2014 | Kondoh | |
| 2016/0291240 A1 | 10/2016 | Sugimoto | |
| 2019/0204678 A1 | 7/2019 | Hosoki | |

FOREIGN PATENT DOCUMENTS

| | | |
|---|---|---|
| JP | 2012-033415 | 2/2012 |
| JP | 2013-190480 | 9/2013 |
| JP | 2014-203602 | 10/2014 |
| WO | 2013/099765 | 7/2013 |
| WO | 2018/043460 | 3/2018 |

OTHER PUBLICATIONS

Extended European Search Report dated Jan. 14, 2020 for the related European Patent Application No. 18775731.5.

* cited by examiner

DISPLAY DEVICE

CROSS-REFERENCE TO RELATED APPLICATIONS

This application is a U.S. national stage application of the PCT International Application No. PCT/JP2018/010677 filed on Mar. 19, 2018, which claims the benefit of foreign priority of Japanese patent application No. 2017-067854 filed on Mar. 30, 2017, the contents all of which are incorporated herein by reference.

TECHNICAL FIELD

The present disclosure relates to a display device for displaying an image.

BACKGROUND ART

A liquid crystal television receiver (e.g., PTL 1) is one of display devices for displaying an image. In the liquid crystal television receiver, an optical sheet for diffusing light from a backlight, for example, is disposed between a liquid crystal cell and the backlight. The optical sheet has a sheet main body portion, and multiple supporting pieces each protruding to a side direction from an outer peripheral part of the sheet main body portion. Each of the multiple supporting pieces is fixed to a mold frame disposed along an outer peripheral part of a light guide plate of the backlight.

CITATION LIST

Patent Literature

PTL 1: Unexamined Japanese Patent Publication No. 2014-203602

SUMMARY OF THE INVENTION

The present disclosure provides a display device that can suppress unevenness in brightness in an outer peripheral part of a display panel.

A display device of the present disclosure includes: a display panel; a backlight that emits light toward a rear face of the display panel; a first optical sheet disposed between the display panel and the backlight; a second optical sheet disposed between the first optical sheet and the backlight; and a supporting member that supports an outer peripheral part of the first optical sheet. The first optical sheet includes a first sheet main body portion, and a first supporting piece that protrudes to a side direction from an outer peripheral part of the first sheet main body portion and is supported by the supporting member. The second optical sheet includes a second sheet main body portion, and a flat portion that is formed into a flat shape in an outer peripheral part of the second sheet main body portion and is disposed so as to correspond to the first supporting piece.

The display device of the present disclosure can suppress unevenness in brightness in an outer peripheral part of a display panel.

DESCRIPTION OF EMBODIMENTS (Knowledge Underlying the Present Disclosure)

The inventors of the present application found that the following problem arises in association with the liquid crystal television receiver disclosed in PTL 1.

In the liquid crystal television receiver disclosed in PTL 1, when a prism sheet having relatively high transmittance is used as the optical sheet, for example, the influence of light reflected from the multiple supporting pieces may cause unevenness in brightness in an outer peripheral part of a liquid crystal cell.

The present disclosure provides a display device that can suppress unevenness in brightness in an outer peripheral part of a display panel.

Hereinafter, exemplary embodiments will be described in detail with reference to the drawings as appropriate. Note, however, that descriptions in more detail than necessary may be omitted. For example, a detailed description of an already well-known matter and an overlapping description of substantially identical configurations may be omitted. This is to avoid unnecessary redundancy in the following description and to facilitate understanding of those skilled in the art.

The accompanying drawings and the following exemplary embodiments described below are provided for those skilled in the art to fully understand the present disclosure, and merely illustrate one example of the present disclosure. Numerical values, shapes, materials, constituent elements, arrangement positions and connection modes of the constituent elements, and the like described in the following exemplary embodiments are merely examples, and therefore are not intended to limit the subject matters of the claims. Also, of the constituent elements in the following exemplary embodiments, constituent elements not recited in the independent claim indicating the broadest concept may be optionally added to the constituent elements described in the independent claim.

Furthermore, the drawings are not necessarily accurate illustrations, but are schematic views simplified as appropriate for ease of understanding of the present disclosure. In the drawings, the same reference numerals are assigned to substantially the same constituent elements, and a duplicate description of such constituent elements may be omitted or simplified.

Note that three axes, i.e., an X-axis, a Y-axis, and a Z-axis, are shown in the drawings, and the X, Y, and Z axes are used as required to describe the following exemplary embodiments. In the present exemplary embodiment, for the sake of convenience, a direction parallel (substantially parallel) to long sides of display unit 6 of display device 2 installed onto a mounting surface is defined as an X-axis direction, a direction parallel (substantially parallel) to short sides of display unit 6 is defined as a Z-axis direction, and a direction orthogonal to both the X-axis and the Y-axis is defined as a Y-axis direction. Also, in display device 2, a side relatively farther from the mounting surface is defined as a "top", a side relatively closer to the mounting surface is defined as a "bottom", and a direction from the bottom to top is defined as a positive Z-direction. A surface (face on which image is displayed) of display unit 6 is defined as a front face, and a face opposite to the front face is defined as a rear face or back face. A direction from the front face to rear face of display unit 6 is defined as a positive Y-direction. Accordingly, a user of display device 2 views an image displayed on display device 2 from a negative Y-direction relative to display device 2. Also, a direction from the left to right when the user faces the front face of display unit 6 is defined as a positive X-direction. In the following exemplary embodiments, components are described with reference to display device 2 placed on the mounting surface substantially parallel to a horizontal plane (X-Y plane). For example, in a description of disassembled display device 2 that cannot be installed onto the mounting surface or of a constituent part of display device 2, the positive Z-direction is still defined as the top, and a negative Z-direction is still defined as the bottom. Definitions for the X-axis and the Y-axis are also given in the same way as in the other drawings. These directions, however, are not absolute directions, but are relative directions illustrated for the sake of convenience. The present disclosure is not limited to these directions.

First Exemplary Embodiment

A first exemplary embodiment is described below with reference to FIGS. 1 to 7.

[1-1. General Configuration of Display Device]

First, a general configuration of display device 2 of the first exemplary embodiment is described with reference to FIGS. 1 to 4.

Figure 1:
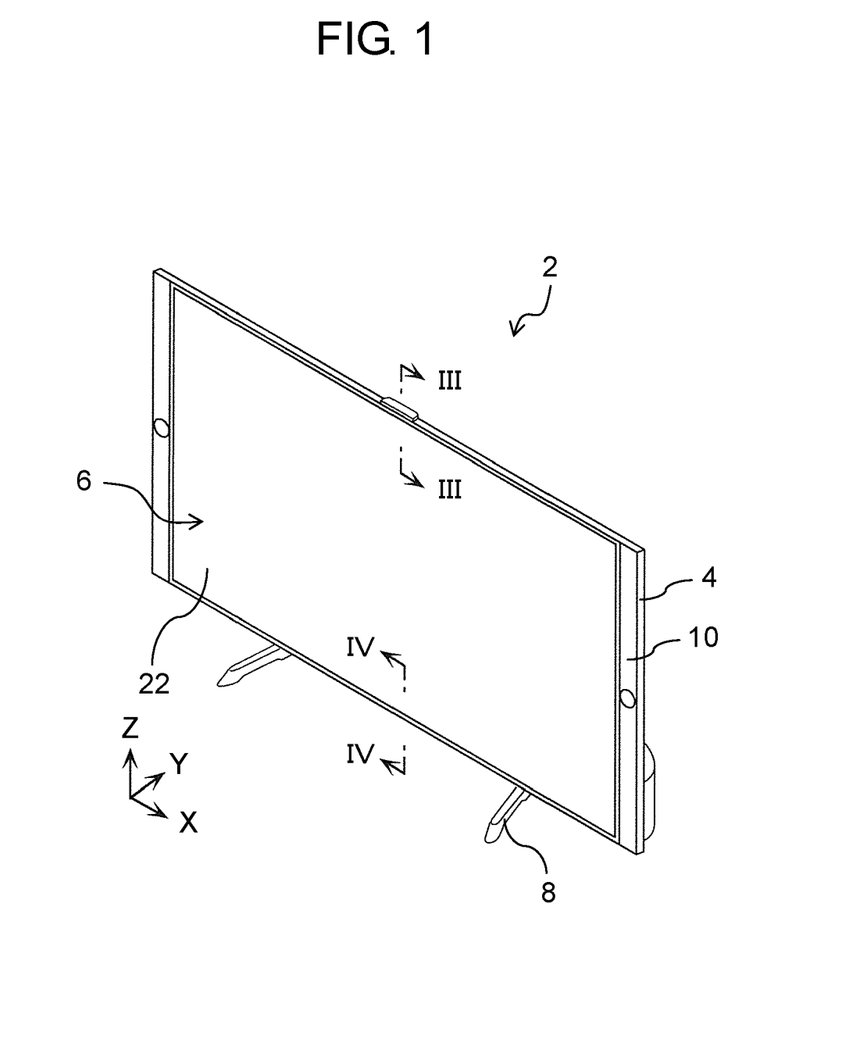
FIG. 1 is a perspective view schematically showing one example of an external appearance of a front side of a display device of a first exemplary embodiment.

FIG. 1 is a perspective view schematically showing one example of an external appearance of a front side of display device 2 of the first exemplary embodiment.

Figure 2:
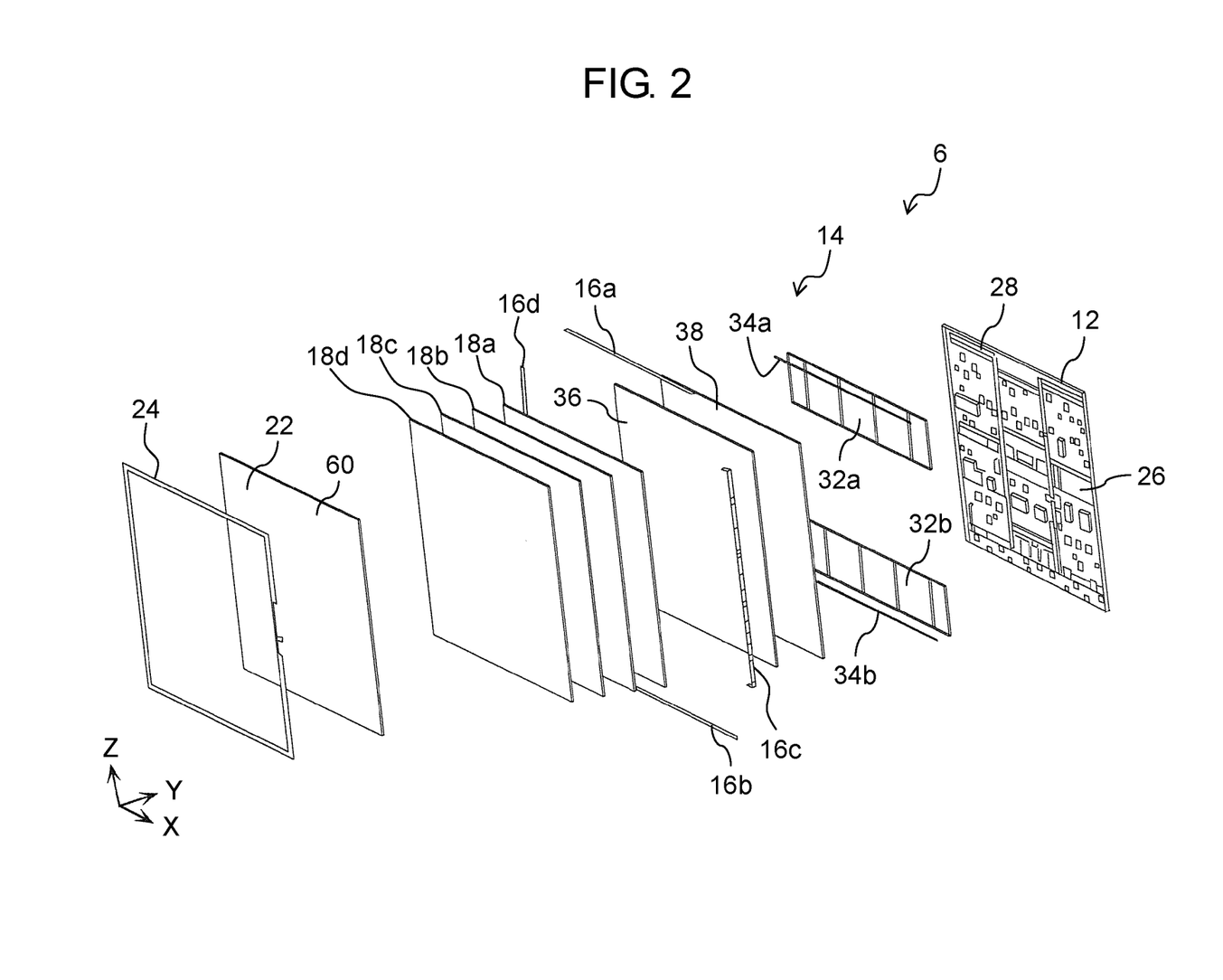
FIG. 2 is an exploded perspective view schematically showing one example of a configuration of a display unit included in the display device of the first exemplary embodiment.

FIG. 2 is an exploded perspective view schematically showing one example of a configuration of display unit 6 included in display device 2 of the first exemplary embodiment.

Figure 3:
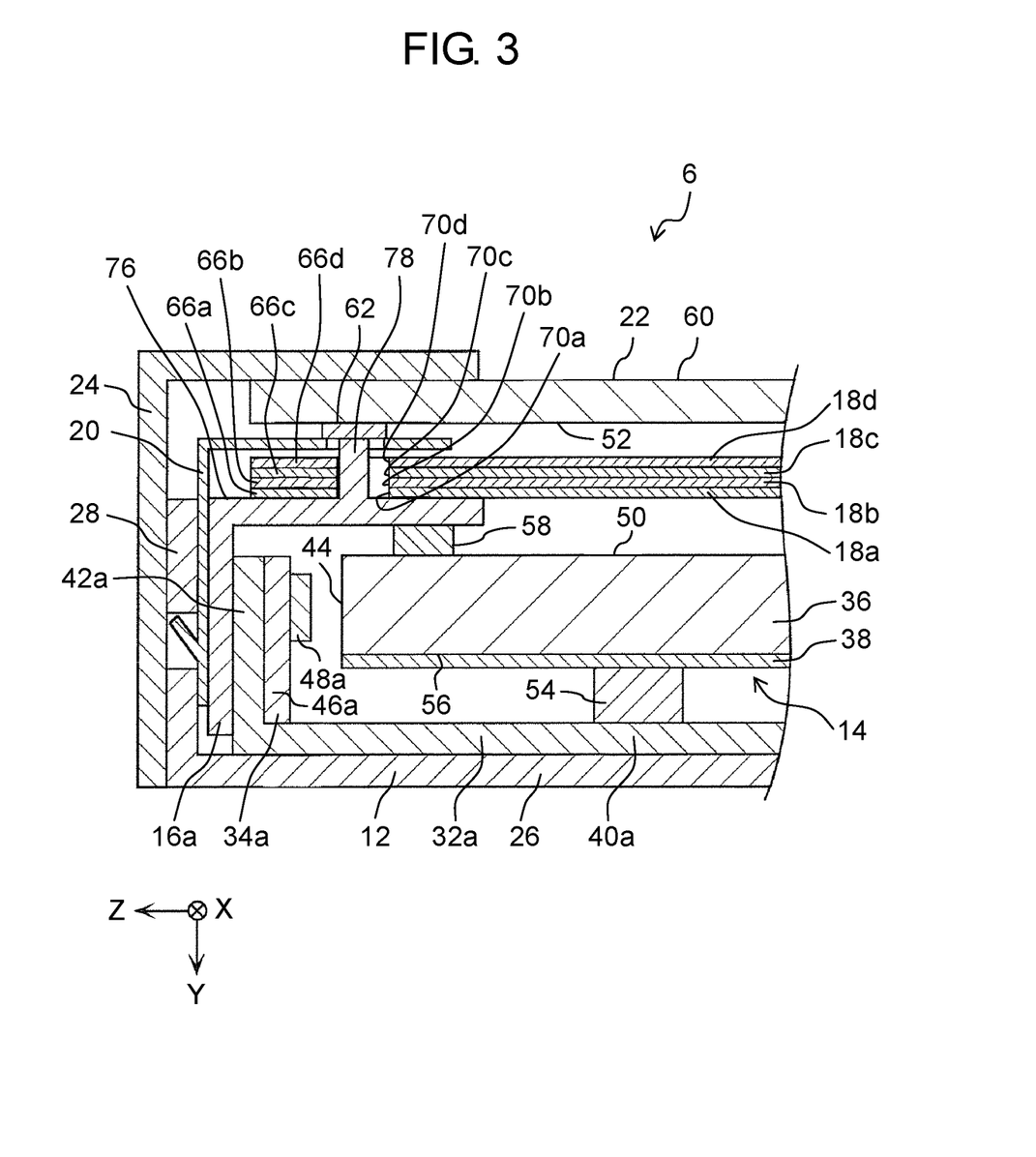
FIG. 3 is a partial cross-sectional view of the display device of the first exemplary embodiment.
Figure 4:
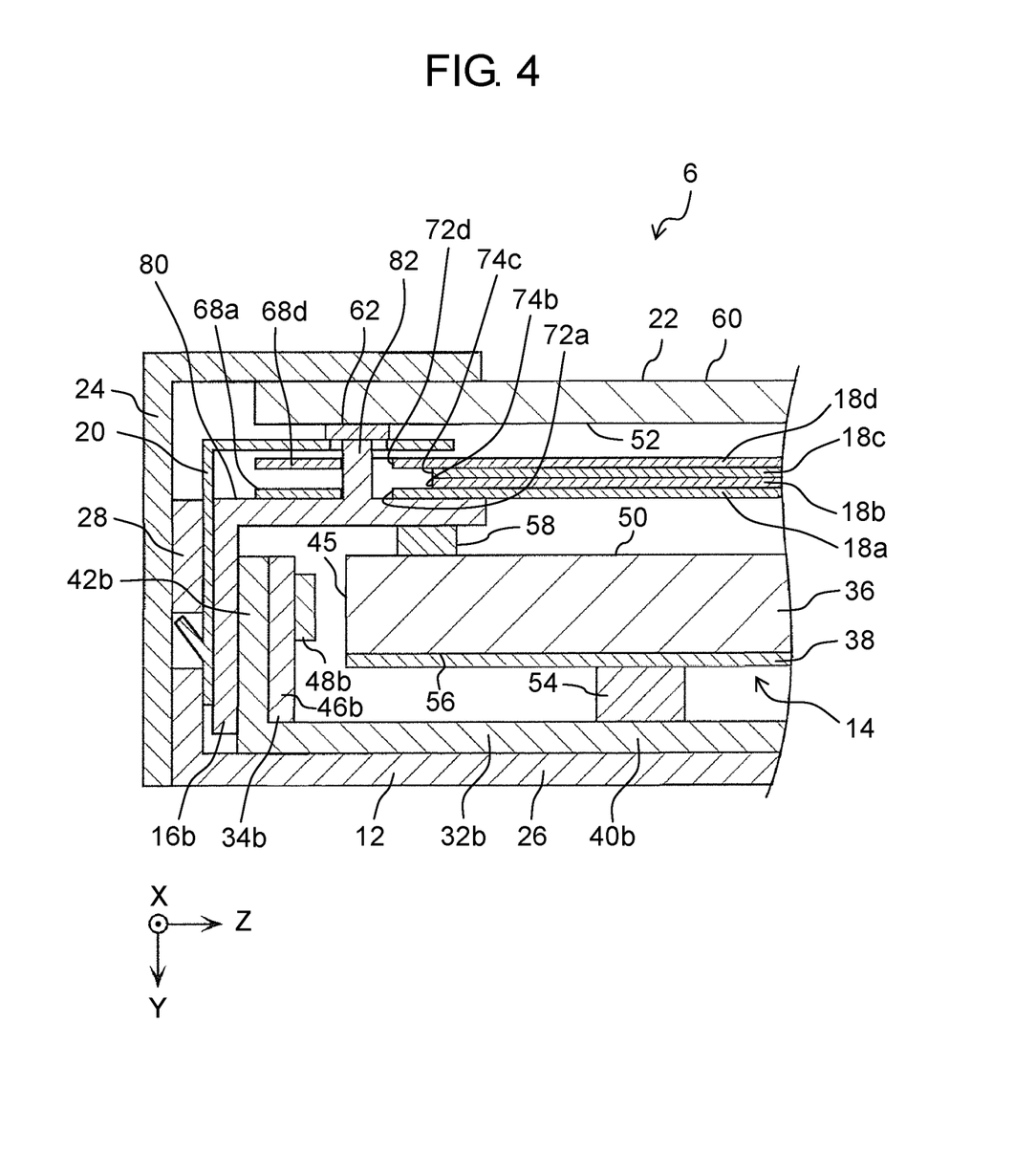
FIG. 4 is a partial cross-sectional view of the display device of the first exemplary embodiment.

FIGS. 3 and 4 are partial cross-sectional views of display device 2 of the first exemplary embodiment. FIG. 3 shows a cross-sectional view taken along line III-III (partial cross-sectional view of upper end part of display unit 6) of FIG. 1. FIG. 4 shows a cross-sectional view taken along line IV-IV (partial cross-sectional view of lower end part of display unit 6) of FIG. 1.

In the present exemplary embodiment, display device 2 is a liquid crystal television receiver of a flat panel display type, for example. As shown in FIG. 1, display device 2 includes housing 4, display unit 6 disposed inside housing 4, and stand 8 supporting housing 4. Note that display device 2 is by no means limited to a liquid crystal television receiver. Display device 2 of the present exemplary embodiment may be any display device that uses a backlight as a light source, and may be a liquid crystal monitor, for example.

Housing 4 has front cabinet 10 shown in FIG. 1, and an unillustrated rear cabinet. Front cabinet 10 is formed in a rectangular frame shape in front view (when viewed in Y-axis direction). Front cabinet 10 covers an outer peripheral part of liquid crystal cell 22 included in display unit 6 from the front side (from negative Y-direction side) of display device 2. Rear cabinet (not shown) covers lower frame 12 (see FIG. 2) from the rear side (from positive Y-direction side) of display device 2. Front cabinet 10 and the rear cabinet are connected to each other.

As shown in FIGS. 2 to 4, display unit 6 includes lower frame 12, backlight 14, mold frames 16a, 16b, 16c, and 16d (16a to 16d), optical sheets 18a, 18b, 18c, and 18d (18a to 18d), multiple fixing brackets 20, liquid crystal cell 22, and bezel 24. Note that fixing bracket 20 is omitted from FIG. 2.

Lower frame 12 is a metal chassis for supporting backlight 14 from the rear side of display device 2. As shown in FIGS. 2 to 4, lower frame 12 has supporting portion 26 having a rectangular shape in front view (when viewed in Y-axis direction), and side wall portion 28 extending substantially vertically toward liquid crystal cell 22 (in negative Y-direction) from an outer peripheral part of supporting portion 26.

Backlight 14 is an edge light type backlight, for example. Backlight 14 has heat sinks 32a and 32b, light emitting diode (LED) bars 34a and 34b, light guide plate 36, and reflective sheet 38.

Heat sink 32a is attached to an upper end part (end part on positive Z-direction side) of supporting portion 26 of lower frame 12. Heat sink 32b is attached to a lower end part (end part on negative Z-direction side) of supporting portion 26 of lower frame 12. Heat sinks 32a and 32b are formed of metal having high thermal conductivity, such as aluminum.

As shown in FIG. 3, heat sink 32a has heat sinking portion 40a, and attachment portion 42a extending substantially vertically toward liquid crystal cell 22 (in negative Y-direction) from one end part (end part on positive Z-direction side) of heat sinking portion 40a. That is, heat sink 32a is formed so as to have a substantially L-shaped sectional shape (sectional shape on Y-Z plane). Heat sink 32a is attached on the upper end part side (in the vicinity of end part on positive Z-direction side) of supporting portion 26 of lower frame 12 by a fixing member such as a screw (not shown). Attachment portion 42a is disposed at a position facing upper face 44 (facing in Z-axis direction) of upper end part (end part on positive Z-direction side) of light guide plate 36.

As shown in FIG. 4, heat sink 32b has heat sinking portion 40b, and attachment portion 42b extending substantially vertically toward liquid crystal cell 22 (in negative Y-direction) from one end part (end part on negative Z-direction side) of heat sinking portion 40b. That is, heat sink 32b is formed so as to have a substantially L-shaped sectional shape (sectional shape on Y-Z plane). Heat sink 32b is attached on the lower end part side (in the vicinity of end part on negative Z-direction side) of supporting portion 26 of lower frame 12 by a fixing member such as a screw (not shown). Attachment portion 42b is disposed at a position facing lower face 45 (facing in Z-axis direction) of lower end part (end part on negative Z-direction side) of light guide plate 36.

Each of LED bars 34a and 34b is a light source that emits light. LED bar 34a is attached to heat sink 32a. LED bar 34b is attached to heat sink 32b.

As shown in FIG. 3, LED bar 34a has substrate 46a and multiple LEDs 48a (FIG. 3 shows only one LED 48a). Substrate 46a is a printed wiring board having a long shape and extended in the longitudinal direction (X-axis direction) of display unit 6. Substrate 46a is attached to attachment portion 42a of heat sink 32a by a thermally conductive pressure sensitive adhesive double coated tape (not shown), for example. Substrate 46a is formed of metal having high thermal conductivity, such as aluminum.

Multiple LEDs 48a are mounted on substrate 46a. Multiple LEDs 48a are arranged in a single line and spaced apart from one another along the longitudinal direction (X-axis direction) of substrate 46a. Each of multiple LEDs 48a is a chip-type LED, for example.

As shown in FIG. 4, LED bar 34b has substrate 46b and multiple LEDs 48b (FIG. 4 shows only one LED 48b). Substrate 46b is a printed wiring board having a long shape and extended in the longitudinal direction (X-axis direction) of display unit 6. Substrate 46b is attached to attachment portion 42b of heat sink 32b by a thermally conductive double-sided adhesive tape (not shown), for example. Substrate 46b is formed of metal having high thermal conductivity, such as aluminum.

Multiple LEDs 48b are mounted on substrate 46b. Multiple LEDs 48b are arranged in a single line and spaced apart from one another along the longitudinal direction (X-axis direction) of substrate 46b. Each of multiple LEDs 48b is a chip-type LED, for example.

Light guide plate 36 is formed in a rectangular plate shape in front view (when viewed in Y-axis direction). Light guide plate 36 is formed by extruding acrylic resin, for example.

As shown in FIGS. 3 and 4, light guide plate 36 is disposed in a position where optical sheets 18a, 18b, 18c, and 18d are sandwiched between light guide plate 36 and liquid crystal cell 22, and principal face 50 (face on negative Y-direction side) of light guide plate 36 faces rear face 52 (face opposite to display face 60, face on positive Y-direction side) of liquid crystal cell 22. Of light guide plate 36, as shown in FIG. 3, the vicinity of an upper end part (end part on positive Z-direction side) of rear face 56 (face opposite to principal face 50, face on positive Y-direction side) of light guide plate 36 is supported by heat sinking portion 40a of heat sink 32a through reflective sheet 38 and cushion member 54, and as shown in FIG. 4, the vicinity of a lower end part (end part on negative Z-direction side) of rear face 56 is supported by heat sinking portion 40b of heat sink 32b through reflective sheet 38 and cushion member 54. Light guide plate 36 is disposed in a position where upper face 44 of the upper end part (end part on positive Z-direction side) faces LED bar 34a as shown in FIG. 3, and lower face 45 of the lower end part (end part on negative Z-direction side) faces LED bar 34b as shown in FIG. 4. Accordingly, light emitted from multiple LEDs 48a included in LED bar 34a enters upper face 44 of light guide plate 36. Light emitted from multiple LEDs 48b included in LED bar 34b enters lower face 45 of light guide plate 36.

Reflective sheet 38 is formed in substantially the same size and shape as light guide plate 36 in front view (when viewed in Y-axis direction). Reflective sheet 38 is disposed on rear face 56 side of light guide plate 36, and covers rear face 56 of light guide plate 36. Of the light having entered upper face 44 and lower face 45 of light guide plate 36, reflective sheet 38 reflects light traveling to rear face 56 side toward principal face 50. Light exiting from principal face 50 of light guide plate 36 contains light reflected by reflective sheet 38, and light exiting from principal face 50 enters rear face 52 (face on positive Y-direction side) of liquid crystal cell 22.

As shown in FIG. 2, each of mold frames 16a, 16b, 16c, and 16d is formed in a long shape. Mold frame 16a is attached to side wall portion 28 disposed in an upper end part (end part on positive Z-direction side) of lower frame 12. Mold frame 16b is attached to side wall portion 28 disposed in a lower end part (end part on negative Z-direction side) of lower frame 12. Mold frame 16c is attached to side wall portion 28 disposed in a right end part (end part on positive X-direction side) of lower frame 12. Mold frame 16d is attached to side wall portion 28 disposed in a left end part (end part on negative X-direction side) of lower frame 12. Accordingly, mold frames 16a, 16b, 16c, and 16d are disposed in a rectangular frame shape along an outer peripheral part of light guide plate 36 in front view (when viewed in Y-axis direction).

As shown in FIGS. 3 and 4, each of mold frames 16a, 16b, 16c, and 16d is supported to an outer peripheral part of principal face 50 of light guide plate 36, through cushion member 58. Mold frame 16a has a function of supporting an outer peripheral part of each of optical sheets 18a, 18b, 18c, and 18d. Mold frame 16b has a function of supporting an outer peripheral part of each of optical sheets 18a and 18d. A configuration of mold frames 16a and 16b will be described later.

As shown in FIGS. 2 to 4, optical sheets 18a, 18b, 18c, and 18d are superimposed in the order of optical sheets 18a, 18b, 18c, 18d from the rear side toward the front side (in negative Y-direction) of display unit 6, and are disposed between liquid crystal cell 22 and light guide plate 36 in the superimposed state. Accordingly, optical sheet 18a is disposed on light guide plate 36 side, and optical sheet 18d is disposed on liquid crystal cell 22 side.

The thickness of each of optical sheets 18a, 18b, 18c, and 18d is 0.1 mm to 0.5 mm, for example. Optical sheet 18a is a diffuser sheet for diffusing light exited from principal face 50 of light guide plate 36. Each of optical sheets 18b and 18c is a prism sheet for collecting light exited from optical sheet 18a. Optical sheet 18d is a reflection type polarizing sheet for polarizing light exited from optical sheet 18c. Examples of a reflection type polarizing sheet include a dual brightness enhancement film (DBEF) (registered trademark) of Sumitomo 3M Limited. The visible light transmittance of optical sheet 18b is higher than the visible light transmittance of optical sheet 18a and is higher than the visible light transmittance of optical sheet 18d. The visible light transmittance of optical sheet 18c is higher than the visible light transmittance of optical sheet 18a and is higher than the visible light transmittance of optical sheet 18d.

An upper end part (end part on positive Z-direction side in outer peripheral part) of each of optical sheets 18a, 18b, 18c, and 18d is supported by mold frame 16a. A lower end part (end part on negative Z-direction side in outer peripheral part) of each of optical sheets 18a and 18d is supported by mold frame 16b. Note that in display unit 6 of the present exemplary embodiment, a lower end part (end part on negative Z-direction side in outer peripheral part) of each of optical sheets 18b and 18c is not supported by mold frame 16b. Details of a configuration of optical sheets 18a, 18b, 18c, and 18d will be described later.

As shown in FIGS. 3 and 4, and later-mentioned FIG. 6, multiple fixing brackets 20 are disposed in positions corresponding to mold frames 16a and 16b. Multiple fixing brackets 20 disposed in positions corresponding to mold frame 16a fix the upper end parts (end parts on positive Z-direction side) of optical sheets 18a, 18b, 18c, and 18d to mold frame 16a. Multiple fixing brackets 20 disposed in positions corresponding to mold frame 16b fix the lower end parts (end parts on negative Z-direction side) of optical sheets 18a and 18d to mold frame 16b. Note that in display unit 6 of the present exemplary embodiment, multiple fixing brackets 20 disposed in positions corresponding to mold frame 16a fix the upper end parts (end parts on positive Z-direction side) of optical sheets 18b and 18c to mold frame 16a, but multiple fixing brackets 20 disposed in positions corresponding to mold frame 16b do not fix the lower end parts (end parts on negative Z-direction side) of optical sheets 18b and 18c to mold frame 16b.

Liquid crystal cell 22 is formed in a rectangular plate shape in front view (when viewed in Y-axis direction). Display face 60 for displaying an image is formed on the front face (face on negative Y-direction side) of liquid crystal cell 22. An outer peripheral part of liquid crystal cell 22 is supported by mold frames 16a, 16b, 16c, and 16d through cushion member 62. As shown in later-mentioned FIG. 6, cushion member 62 adheres to the entire perimeter of mold frames 16a, 16b, 16c, and 16d.

Bezel 24 is formed in a rectangular frame shape in front view (when viewed in Y-axis direction), and is disposed at a position covering an outer peripheral part of display face 60 of liquid crystal cell 22. Bezel 24 is attached to side wall portion 28 of lower frame 12 by a screw (not shown), for example.

[1-2. Configuration of Optical Sheet]

Next, the configuration of optical sheets 18a, 18b, 18c, and 18d is described with reference to FIG. 5.

Figure 5:
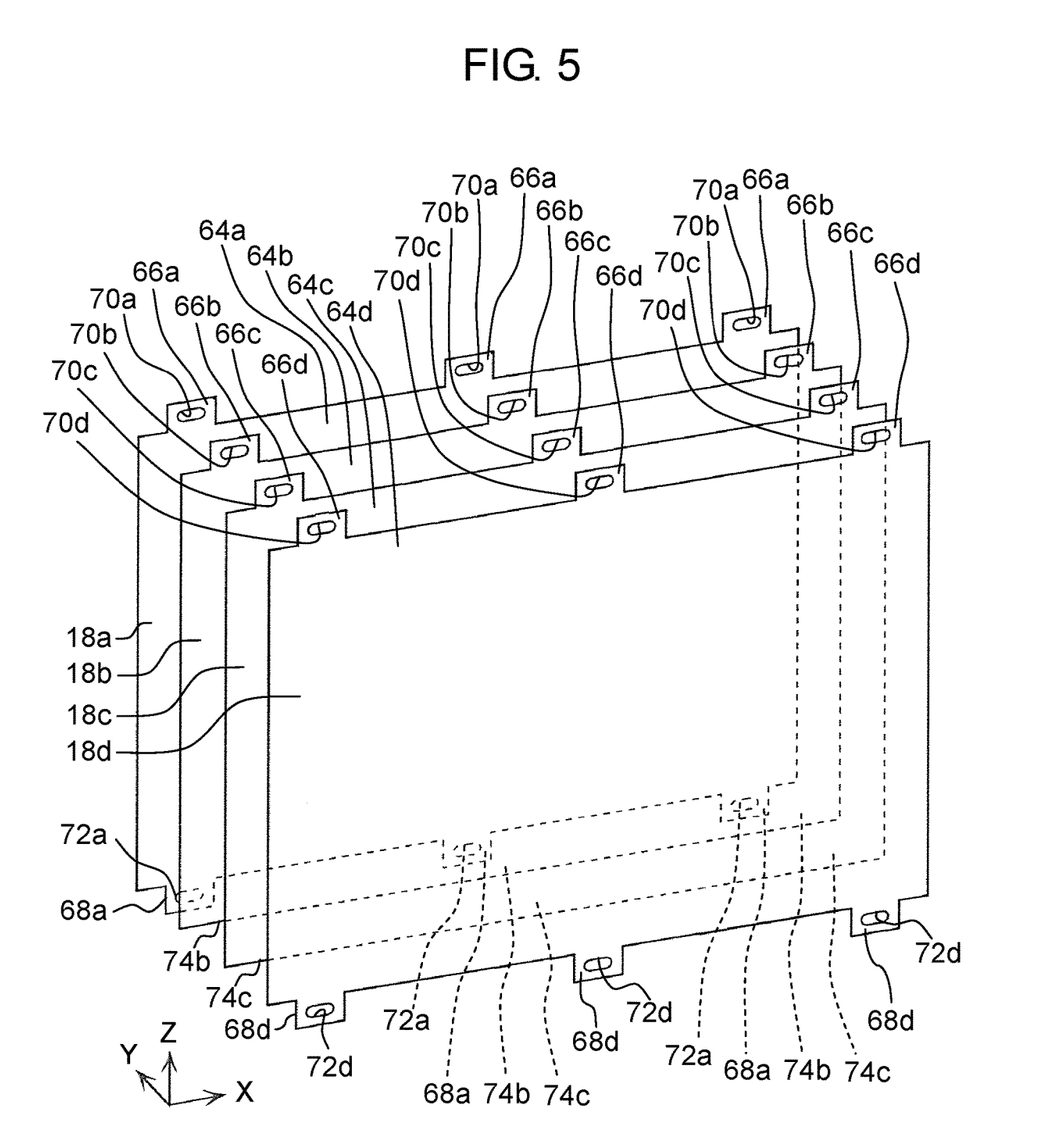
FIG. 5 is an exploded perspective view schematically showing one example of a configuration of multiple optical sheets included in the display device of the first exemplary embodiment.

FIG. 5 is an exploded perspective view schematically showing one example of the configuration of optical sheets 18a, 18b, 18c, and 18d included in display device 2 of the first exemplary embodiment.

As shown in FIG. 5, optical sheet 18a has sheet main body portion 64a having a rectangular shape in front view (when viewed in Y-axis direction), multiple (e.g., three) supporting pieces 66a protruding upward (positive Z-direction) from an upper end part (end part on positive Z-direction side of outer peripheral part) of sheet main body portion 64a, and multiple (e.g., three) supporting pieces 68a protruding downward (negative Z-direction) from a lower end part (end part on negative Z-direction side of outer peripheral part) of sheet main body portion 64a. Multiple (e.g., three) supporting pieces 66a are arranged along the upper end part of sheet main body portion 64a (in X-axis direction), and are spaced apart from one another. Long hole shaped insertion hole 70a extending in the longitudinal direction (X-axis direction) of sheet main body portion 64a is formed in each of multiple (e.g., three) supporting pieces 66a. Multiple (e.g., three) supporting pieces 68a are arranged along the lower end part of sheet main body portion 64a (in X-axis direction), and are spaced apart from one another. Long hole shaped insertion hole 72a extending in the longitudinal direction (X-axis direction) of sheet main body portion 64a is formed in each of multiple (e.g., three) supporting pieces 68a.

As shown in FIG. 5, optical sheet 18b has sheet main body portion 64b having a rectangular shape in front view (when viewed in Y-axis direction), multiple (e.g., three) supporting pieces 66b protruding upward (positive Z-direction) from an upper end part (end part on positive Z-direction side of outer peripheral part) of sheet main body portion 64b, and multiple (e.g., three) flat portions 74b each of which is formed into a flat shape in a lower end part (end part on negative Z-direction side of outer peripheral part) of sheet main body portion 64b. Multiple (e.g., three) supporting pieces 66b are arranged along the upper end part of sheet main body portion 64b (in X-axis direction), and are spaced apart from one another. The spacing interval between multiple (e.g., three) supporting pieces 66b is substantially the same as the spacing interval between multiple (e.g., three) supporting pieces 66a of optical sheet 18a. Long hole shaped insertion hole 70b extending in the longitudinal direction (X-axis direction) of sheet main body portion 64b is formed in each of multiple (e.g., three) supporting pieces 66b. Multiple (e.g., three) flat portions 74b are arranged along the lower end part of sheet main body portion 64b (in X-axis direction), and are spaced apart from one another. The spacing interval between multiple (e.g., three) flat portions 74b is substantially the same as the spacing interval between multiple (e.g., three) supporting pieces 68a of optical sheet 18a. Note that in the present exemplary embodiment, the description "flat portions are arranged along the end part of the sheet main body portion" mentioned above indicates that no supporting piece is formed on the end part of the sheet main body portion and the end part is flat. Hence, in display device 2 of the present exemplary embodiment, the lower end part of sheet main body portion 64b does not have downwardly (negative Z-direction) protruding supporting pieces like supporting pieces 68a of optical sheet 18a, and the lower end part of sheet main body portion 64b is flat in the longitudinal direction (X-axis direction).

As shown in FIG. 5, optical sheet 18c has sheet main body portion 64c having a rectangular shape in front view (when viewed in Y-axis direction), multiple (e.g., three) supporting pieces 66c protruding upward (positive Z-direction) from an upper end part (end part on positive Z-direction side of outer peripheral part) of sheet main body portion 64c, and multiple (e.g., three) flat portions 74c each of which is formed into a flat shape in a lower end part (end part on negative Z-direction side of outer peripheral part) of sheet main body portion 64c. Multiple (e.g., three) supporting pieces 66c are arranged along the upper end part of sheet main body portion 64c (in X-axis direction), and are spaced apart from one another. The spacing interval between multiple (e.g., three) supporting pieces 66c is substantially the same as the spacing interval between multiple (e.g., three) supporting pieces 66a of optical sheet 18a. Long hole shaped insertion hole 70c extending in the longitudinal direction (X-axis direction) of sheet main body portion 64c is formed in each of multiple (e.g., three) supporting pieces 66c. Multiple (e.g., three) flat portions 74c are arranged along the lower end part of sheet main body portion 64c (in X-axis direction), and are spaced apart from one another. The spacing interval between multiple (e.g., three) flat portions 74c is substantially the same as the spacing interval between multiple (e.g., three) supporting pieces 68a of optical sheet 18a. Note that as mentioned earlier, in the present exemplary embodiment, the description "flat portions are arranged along the end part of the sheet main body portion" indicates that no supporting piece is formed on the end part of the sheet main body portion and the end part is flat. Hence, in display device 2 of the present exemplary embodiment, the lower end part of sheet main body portion 64c does not have downwardly (negative Z-direction) protruding supporting pieces like supporting pieces 68a of optical sheet 18a, and the lower end part of sheet main body portion 64c is flat in the longitudinal direction (X-axis direction).

As shown in FIG. 5, optical sheet 18d has sheet main body portion 64d having a rectangular shape in front view (when viewed in Y-axis direction), multiple (e.g., three) supporting pieces 66d protruding upward (positive Z-direction) from an upper end part (end part on positive Z-direction side of outer peripheral part) of sheet main body portion 64d, and multiple (e.g., three) supporting pieces 68d protruding downward (negative Z-direction) from a lower end part (end part on negative Z-direction side of outer peripheral part) of sheet main body portion 64d. Multiple (e.g., three) supporting pieces 66d are arranged along the upper end part of sheet main body portion 64d (in X-axis direction), and are spaced apart from one another. The spacing interval between multiple (e.g., three) supporting pieces 66d is substantially the same as the spacing interval between multiple (e.g., three) supporting pieces 66a of optical sheet 18a. Long hole shaped insertion hole 70d extending in the longitudinal direction (X-axis direction) of sheet main body portion 64d is formed in each of multiple (e.g., three) supporting pieces 66d. Multiple (e.g., three) supporting pieces 68d are arranged along the lower end part of sheet main body portion 64d (in X-axis direction), and are spaced apart from one another. The spacing interval between multiple (e.g., three) supporting pieces 68d is substantially the same as the spacing interval between multiple (e.g., three) supporting pieces 68a of optical sheet 18a. Long hole shaped insertion hole 72d extending in the longitudinal direction (X-axis direction) of sheet main body portion 64d is formed in each of multiple (e.g., three) supporting pieces 68d.

[1-3. Structures for Supporting Optical Sheets]

Next, structures for supporting optical sheets 18a to 18d are described with reference to FIGS. 3, 4, and 6.

Figure 6:
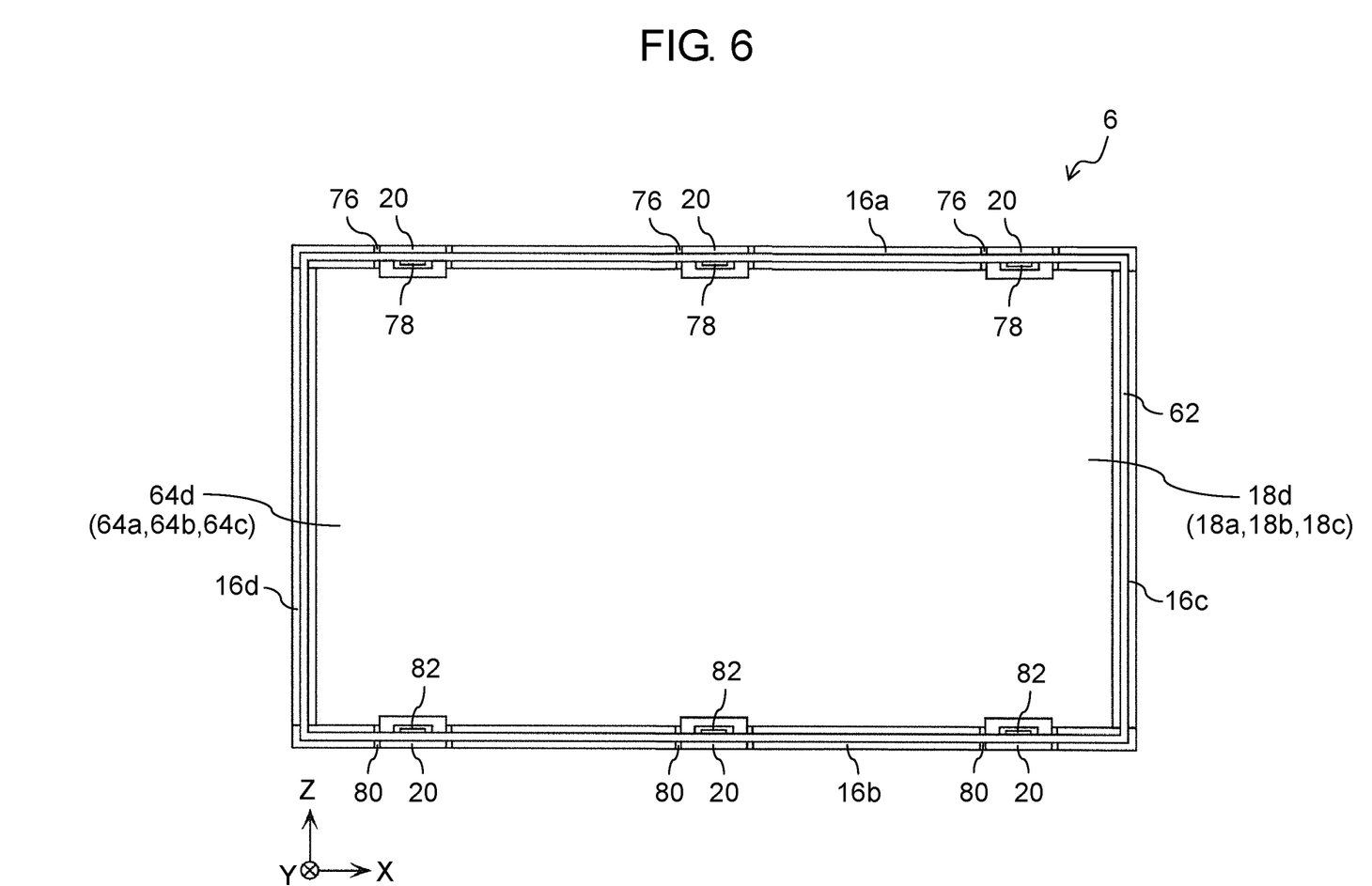
FIG. 6 is a diagram schematically showing one example of an external appearance of the display unit included in the display device of the first exemplary embodiment.

FIG. 6 is a diagram schematically showing one example of an external appearance of display unit 6 included in display device 2 of the first exemplary embodiment.

As shown in FIGS. 3 and 6, the upper end parts (end parts on positive Z-direction side) of optical sheets 18a, 18b, 18c, and 18d are fixed to mold frame 16a by multiple (e.g., three) fixing brackets 20. Multiple (e.g., three) cutouts 76 are formed in mold frame 16a. Multiple (e.g., three) cutouts 76 are arranged along the longitudinal direction (X-axis direction) of mold frame 16a, and are spaced apart from one another. The arrangement positions of multiple (e.g., three) cutouts 76 correspond to the arrangement positions of multiple (e.g., three) supporting pieces 66a (66b, 66c, 66d). Supporting pieces 66a, 66b, 66c, and 66d superimposed on one another are disposed in each of multiple (e.g., three) cutouts 76. Horizontally long protrusion 78 extending in the longitudinal direction (X-axis direction) of mold frame 16a is formed in each of multiple (e.g., three) cutouts 76. Protrusion 78 formed in each of multiple (e.g., three) cutouts 76 is inserted into insertion hole 70a of supporting piece 66a, insertion hole 70b of supporting piece 66b, insertion hole 70c of supporting piece 66c, and insertion hole 70d of supporting piece 66d. Note that supporting pieces 66a, 66b, 66c, and 66d superimposed on one another are fixed to cutout 76 of mold frame 16a by fixing bracket 20. As shown in FIG. 3, supporting pieces 66a, 66b, 66c, and 66d superimposed on one another are disposed in a position facing an upper end part (end part on positive Z-direction side) of liquid crystal cell 22.

As shown in FIGS. 4 and 6, the lower end parts (end parts on negative Z-direction side) of optical sheets 18a and 18d are fixed to mold frame 16b by multiple (e.g., three) fixing brackets 20. Multiple (e.g., three) cutouts 80 are formed in mold frame 16b. Multiple (e.g., three) cutouts 80 are arranged along the longitudinal direction (X-axis direction) of mold frame 16b, and are spaced apart from one another. The arrangement positions of multiple (e.g., three) cutouts 80 correspond to the arrangement positions of multiple (e.g., three) supporting pieces 68a (68d). Supporting pieces 68a and 68d superimposed on one another are disposed in each of multiple (e.g., three) cutouts 80. Horizontally long protrusion 82 extending in the longitudinal direction (X-axis direction) of mold frame 16b is formed in each of multiple (e.g., three) cutouts 80. Protrusion 82 formed in each of multiple (e.g., three) cutouts 80 is inserted into insertion hole 72a of supporting piece 68a and insertion hole 72d of supporting piece 68d. Note that supporting pieces 68a and 68d superimposed on one another are fixed to cutout 80 of mold frame 16b by fixing bracket 20. At this time, flat portion 74b of optical sheet 18b and flat portion 74c of optical sheet 18c are superimposed on one another and sandwiched between a lower end part (end part on negative Z-direction side) of sheet main body portion 64a of optical sheet 18a and a lower end part (end part on negative Z-direction side) of sheet main body portion 64d of optical sheet 18d. Flat portion 74b of optical sheet 18b and flat portion 74c of optical sheet 18c are not fixed to cutout 80 of mold frame 16b. As shown in FIG. 4, supporting pieces 68a and 68d superimposed on one another are disposed in a position facing a lower end part (end part on negative Z-direction side) of liquid crystal cell 22.

[1-4. Effects and Others]

As has been described, in the present exemplary embodiment, a display device includes: a display panel; a backlight that emits light toward a rear face of the display panel; a first optical sheet disposed between the display panel and the backlight; a second optical sheet disposed between the first optical sheet and the backlight; and a supporting member that supports an outer peripheral part of the first optical sheet. The first optical sheet includes a first sheet main body portion, and a first supporting piece that protrudes to a side direction from an outer peripheral part of the first sheet main body portion and is supported by the supporting member. The second optical sheet includes a second sheet main body portion, and a flat portion that is formed into a flat shape in an outer peripheral part of the second sheet main body portion and is disposed so as to correspond to the first supporting piece.

Note that display device 2 is an example of the display device. Liquid crystal cell 22 is an example of the display panel. Backlight 14 is an example of the backlight. Optical sheet 18d is an example of the first optical sheet. Mold frame 16b is an example of the supporting member. The lower side (negative Z-direction) is an example of a side. Optical sheets 18b and 18c are each an example of the second optical sheet. Sheet main body portion 64d is an example of the first sheet main body portion. Supporting piece 68d is an example of the first supporting piece. Sheet main body portions 64b and 64c are each an example of the second sheet main body portion. Flat portions 74b and 74c are each an example of the flat portion.

For example, in the example shown in the first exemplary embodiment, display device 2 includes: liquid crystal cell 22; backlight 14 that emits light toward a rear face of liquid crystal cell 22; optical sheet 18d disposed between liquid crystal cell 22 and backlight 14; optical sheets 18b and 18c disposed between optical sheet 18d and backlight 14; and mold frame 16b that supports an outer peripheral part of optical sheet 18d. Optical sheet 18d has sheet main body portion 64d, and supporting piece 68d that protrudes to a side direction (e.g., lower side, negative Z-direction) from an outer peripheral part of sheet main body portion 64d and is supported by mold frame 16b. Optical sheet 18b has sheet main body portion 64b, and flat portion 74b that is formed into a flat shape in an outer peripheral part of sheet main body portion 64b and is disposed so as to correspond to supporting piece 68d. Optical sheet 18c has sheet main body portion 64c, and flat portion 74c that is formed into a flat shape in an outer peripheral part of sheet main body portion 64c and is disposed so as to correspond to supporting piece 68d.

Hereinafter, effects of display device 2 of the first exemplary embodiment are described with reference to FIG. 7.

Figure 7:
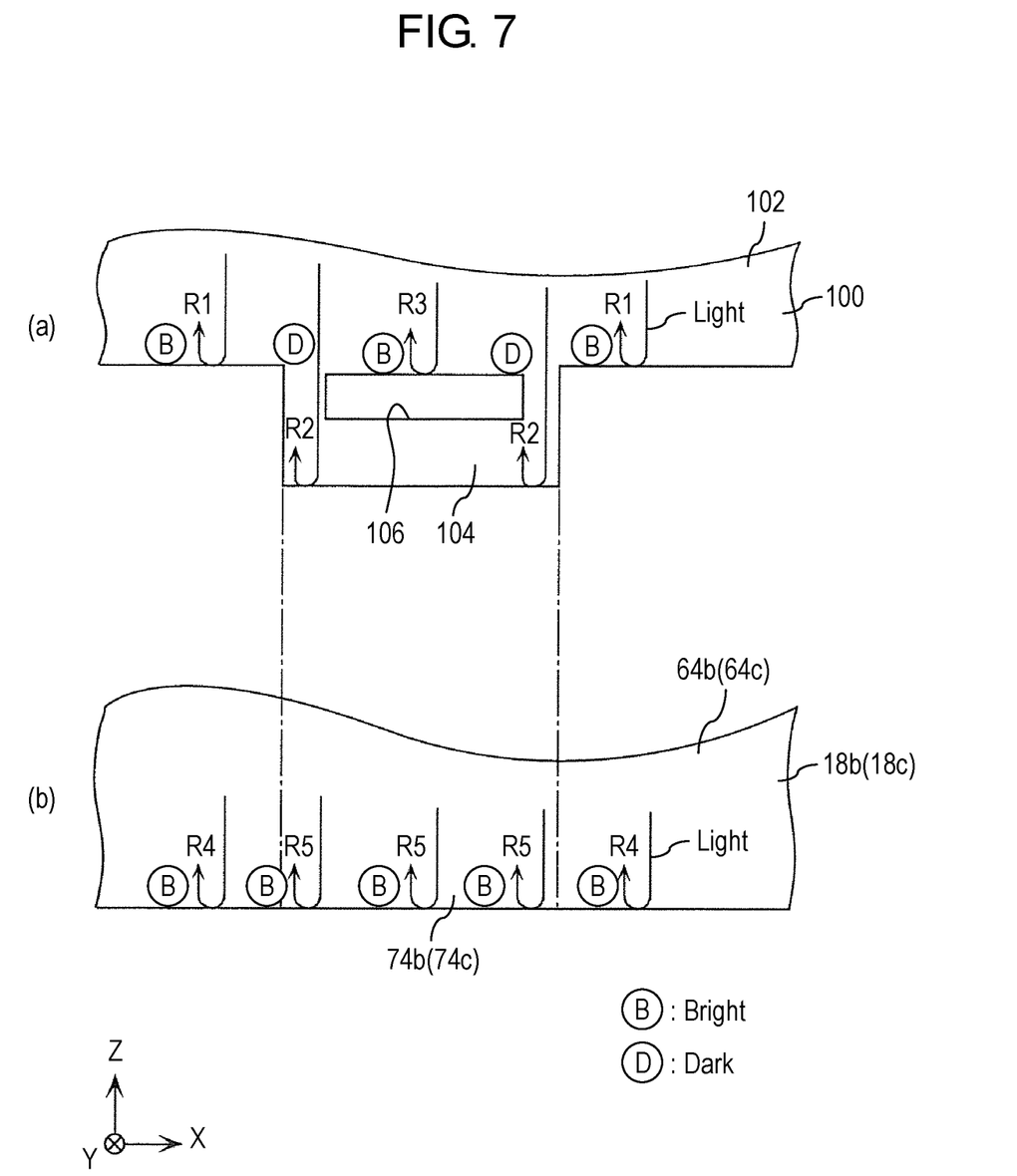
FIG. 7 is a diagram for describing effects of the display device of the first exemplary embodiment.

FIG. 7 is a diagram for describing effects of display device 2 of the first exemplary embodiment. Part (a) of FIG. 7 is a diagram for describing reflection of light on optical sheet 100 included in a display device shown as a comparative example. Part (b) of FIG. 7 is a diagram for describing reflection of light on optical sheet 18b (18c) included in display device 2 of the first exemplary embodiment.

Optical sheet 100 of the display device shown as a comparative example in part (a) of FIG. 7 is a diffuser sheet. Optical sheet 100 has sheet main body portion 102 having a rectangular shape in front view (when viewed in Y-axis direction), and supporting piece 104 protruding downward (negative Z-direction) from a lower end part (end part on negative Z-direction side) of sheet main body portion 102. Insertion hole 106 is formed in supporting piece 104. Most part of light having entered sheet main body portion 102 passes through sheet main body portion 102 in a thickness direction (Y-axis direction) of sheet main body portion 102, and exits from sheet main body portion 102. At this time, a part of the light having entered sheet main body portion 102 travels in a direction (any direction in X-Z plane) orthogonal to the thickness direction (Y-axis direction) of sheet main body portion 102, in sheet main body portion 102.

As shown in part (a) of FIG. 7, a part of light traveling through the inside (in X-Z plane) of sheet main body portion 102 becomes a) reflected light R1 by being reflected on a lower end part (end part on negative Z-direction side) of sheet main body portion 102, another part of the light traveling through the inside of sheet main body portion 102 becomes b) reflected light R2 by being reflected on a lower end part (end part on negative Z-direction side) of supporting piece 104, and yet another part of the light traveling through the inside of sheet main body portion 102 becomes c) reflected light R3 by being reflected on a circumferential edge part of insertion hole 106. At this time, an optical path length of reflected light R2 is longer than optical path lengths of reflected lights R1 and R3. Accordingly, an amount of light of reflected light R2 attenuates more than reflected lights R1 and R3 in sheet main body portion 102. Hence, the amount of light of reflected light R2 becomes smaller than reflected light R1 and becomes smaller than reflected light R3. As a result, brightness tends to become uneven around supporting piece 104 in an outer peripheral part of a liquid crystal cell (not shown).

On the other hand, in display device 2 shown in the present exemplary embodiment, optical sheet 18b (18c) has flat portion 74b (74c) that is formed into a flat shape in the outer peripheral part of sheet main body portion 64b (64c), and is disposed so as to correspond to supporting piece 68d.

In display device 2 configured in this manner, as shown in part (b) of FIG. 7, a part of light entering sheet main body portion 64b (64c) and traveling through the inside (in X-Z plane) of sheet main body portion 64b (64c) becomes a) reflected light R4 by being reflected on a lower end part (end part on negative Z-direction side) of sheet main body portion 64b (64c), and another part of the light entering sheet main body portion 64b (64c) and traveling through the inside of sheet main body portion 64b (64c) becomes b) reflected light R5 by being reflected on flat portion 74b (74c). At this time, an optical path length of reflected light R5 is substantially the same as an optical path length of reflected light R4. Accordingly, an amount of light of reflected light R5 is substantially the same as an amount of light of reflected light R4. As a result, in display device 2, as compared to the display device shown in part (a) of FIG. 7 as a comparative example, it is possible to suppress unevenness in brightness around flat portion 74b (74c) corresponding to the position of supporting piece 104, in the outer peripheral part of liquid crystal cell 22.

The display device may further include a third optical sheet disposed between the second optical sheet and the backlight. The third optical sheet may have a third sheet main body portion, and a second supporting piece that protrudes to a side direction from an outer peripheral part of the third sheet main body portion and is supported by the supporting member while being superimposed on the first supporting piece.

Note that optical sheet 18a is an example of the third optical sheet. Sheet main body portion 64a is an example of the third sheet main body portion. Supporting piece 68a is an example of the second supporting piece.

For example, in the example shown in the first exemplary embodiment, display device 2 further includes optical sheet 18a disposed between optical sheet 18b (18c) and backlight 14. Optical sheet 18a has sheet main body portion 64a, and supporting piece 68a that protrudes to a side direction (e.g., lower side, negative Z-direction) from an outer peripheral part of sheet main body portion 64a and is supported by mold frame 16b while being superimposed on supporting piece 68d.

In display device 2 configured in this manner, it is possible to fix optical sheet 18b (18c) by sandwiching optical sheet 18b (18c) between optical sheet 18a and optical sheet 18d.

In the display device, a first insertion hole may be formed in the first supporting piece. A second insertion hole may be formed in the second supporting piece. The supporting member may have a protrusion inserted into the first insertion hole and the second insertion hole.

Note that insertion hole 72d is an example of the first insertion hole. Insertion hole 72a is an example of the second insertion hole. Protrusion 82 is an example of the protrusion.

For example, in the example shown in the first exemplary embodiment, in the display device 2, insertion hole 72d is formed in supporting piece 68d, and insertion hole 72a is formed in supporting piece 68a. Mold frame 16b has protrusion 82 inserted into insertion hole 72d and insertion hole 72a.

In display device 2 configured in this manner, optical sheets 18a and 18d can easily be supported by mold frame 16b.

In the display device, the visible light transmittance of the second optical sheet may be higher than the visible light transmittance of the first optical sheet and may be higher the visible light transmittance of the third optical sheet.

For example, in the example shown in the first exemplary embodiment, the visible light transmittance of optical sheet 18b is higher than the visible light transmittance of optical sheet 18d and is higher than the visible light transmittance of optical sheet 18a in display device 2. The visible light transmittance of optical sheet 18c is higher than the visible light transmittance of optical sheet 18d and is higher than the visible light transmittance of optical sheet 18a.

Assume that a supporting piece is provided in optical sheet 18b (18c) having relatively high transmittance. In this case, as has been described with reference to FIG. 7, brightness may become uneven around the supporting piece in the outer peripheral part of liquid crystal cell 22. However, in display device 2 shown in the present exemplary embodiment, no supporting piece is provided in optical sheets 18b and 18c. Accordingly, unevenness in brightness in the outer peripheral part of liquid crystal cell 22 can be suppressed effectively.

In the display device, the third optical sheet may be a diffuser sheet that diffuses light from the backlight. The second optical sheet may be a prism sheet that collects light diffused by the third optical sheet. The first optical sheet may be a reflection type polarizing sheet that polarizes light collected by the second optical sheet.

For example, in the example shown in the first exemplary embodiment, in the display device 2, optical sheet 18a is a diffuser sheet that diffuses light emitted from backlight 14. Each of optical sheets 18b and 18c is a prism sheet that collects light diffused by optical sheet 18a. Optical sheet 18d is a reflection type polarizing sheet that polarizes light collected by optical sheets 18b and 18c.

Assume that a supporting piece is provided in optical sheet 18b (18c) formed of a prism sheet having relatively high transmittance. In this case, as has been described with reference to FIG. 7, brightness may become uneven around the supporting piece in the outer peripheral part of liquid crystal cell 22. However, in display device 2 shown in the present exemplary embodiment, no supporting piece is provided in optical sheets 18b and 18c. Accordingly, unevenness in brightness in the outer peripheral part of liquid crystal cell 22 can be suppressed effectively.

Other Exemplary Embodiments

The first exemplary embodiment has been described above as an example of the technique disclosed in the present application. However, the technique of the present disclosure is not limited thereto, and can also be applied to exemplary embodiments subjected to alteration, substitution, addition, omission, and the like. In addition, new exemplary embodiments can be made by combining constituent elements described in the first exemplary embodiment.

Hence, other exemplary embodiments are described below.

In the first exemplary embodiment, an exemplary configuration where display device 2 is a liquid crystal television receiver has been described. However, the present disclosure is by no means limited to this exemplary configuration. Display device 2 may be, for example, various display devices such as a liquid crystal display of a personal computer, and an organic electro luminescence (EL) display.

In the first exemplary embodiment, an exemplary configuration where display device 2 includes four optical sheets 18a, 18b, 18c, and 18d has been described. However, the present disclosure is by no means limited to this exemplary configuration. The number of optical sheets included in display device 2 may be four or more, or may be less than four. For example, display device 2 may be configured to include only two optical sheets (e.g., optical sheets 18c and 18d) of optical sheets 18a, 18b, 18c, and 18d.

In the first exemplary embodiment, an exemplary configuration where mold frame 16b supports the outer peripheral part of each of optical sheets 18a and 18d in display device 2 has been described. However, the present disclosure is by no means limited to this exemplary configuration. For example, display device 2 may be configured such that, instead of mold frame 16b, lower frame 12 supports the outer peripheral part of each of optical sheets 18a and 18d. In the case of this exemplary configuration, lower frame 12 is an example of the supporting member.

In the first exemplary embodiment, an exemplary configuration where optical sheet 18a formed of a diffuser sheet is provided in display device 2 has been described. However, the present disclosure is by no means limited to this exemplary configuration. For example, display device 2 may be configured such that optical sheet 18a is omitted, and a diffuser layer is formed on principal face 50 of light guide plate 36.

In the first exemplary embodiment, an exemplary configuration where flat portion 74b (74c) is provided in the lower end part of sheet main body portion 64b (64c) of optical sheet 18b (18c) has been described. However, the present disclosure is by no means limited to this exemplary configuration. For example, display device 2 may be configured such that a flat portion is provided in each of an upper end part and a lower end part of sheet main body portion 64b (64c). In this exemplary configuration, too, in display device 2, it is possible to fix optical sheet 18b (18c) by sandwiching optical sheet 18b (18c) between optical sheet 18a and optical sheet 18d.

Note that in general, when a user views an image on display device 2, unevenness in brightness in a lower end part (end part on negative Z-direction side) of liquid crystal cell 22 tends to stand out more than unevenness in brightness in an upper end part (end part on positive Z-direction side) of liquid crystal cell 22. Hence, it is possible to sufficiently suppress unevenness in brightness, even with the configuration of display device 2 shown in the first exemplary embodiment where flat portion 74b (74c) is provided only in the lower end part (end part on negative Z-direction side) of sheet main body portion 64b (64c) of optical sheet 18b (18c).

In the first exemplary embodiment, an exemplary configuration where display device 2 includes a supporting piece protruding upward from an upper end part of the sheet main body portion and a supporting piece protruding downward from a lower end part of the sheet main body portion in the optical sheet has been described. However, the present disclosure is by no means limited to this exemplary configuration. Display device 2 may include, for example, a supporting piece protruding rightward from a right end part of a sheet main body portion and a supporting piece protruding leftward from a left end part of the sheet main body portion in an optical sheet. The supporting pieces may be supported by mold frames 16c and 16d.

The foregoing exemplary embodiments have been described as examples of the technique of the present disclosure. The accompanying drawings and the detailed description have been provided for this purpose.

For illustration of the above technique, the constituent elements illustrated and described in the accompanying drawings and the detailed description may include not only the constituent elements that are essential for solving the problem but also constituent elements that are not essential for solving the problem. These non-essential constituent elements therefore should not be instantly construed as being essential, based on the fact that the non-essential constituent elements are illustrated and described in the accompanying drawings and the detailed description.

Further, the foregoing exemplary embodiments are provided to exemplify the technique of the present disclosure, and thus various alterations, substitutions, additions, omissions, and the like can be made within the scope of the claims or equivalents of the claims.

INDUSTRIAL APPLICABILITY

The present disclosure is applicable to a display device for displaying an image. Specifically, the present disclosure is applicable to a display device such as a liquid crystal television receiver.

REFERENCE MARKS IN THE DRAWINGS

2: display device
4: housing
6: display unit
8: stand
10: front cabinet
12: lower frame
14: backlight
16a, 16b, 16c, 16d: mold frame
18a, 18b, 18c, 18d, 100: optical sheet
20: fixing bracket
22: liquid crystal cell
24: bezel
26: supporting portion
28: side wall portion
32a, 32b: heat sink
34a, 34b: LED bar
36: light guide plate
38: reflective sheet
40a, 40b: heat sinking portion
42a, 42b: attachment portion
44: upper face
45: lower face
46a, 46b: substrate
48a, 48b: LED
50: principal face
52, 56: rear face
54, 58, 62: cushion member
60: display face
64a, 64b, 64c, 64d, 102: sheet main body portion
66a, 66b, 66c, 66d, 68a, 68d, 104: supporting piece
70a, 70b, 70c, 70d, 72a, 72d, 106: insertion hole
74b, 74c: flat portion
76, 80: cutout
78, 82: protrusion
R1, R2, R3, R4, R5: reflected light

The invention claimed is:

1. A display device comprising:
a display panel;
a backlight that emits light toward a rear face of the display panel;
a first optical sheet disposed between the display panel and the backlight;
a second optical sheet disposed between the first optical sheet and the backlight; and
a supporting member that supports an outer peripheral part of the first optical sheet, wherein:
the first optical sheet includes:
a first sheet main body portion having a rectangular shape, and
first supporting pieces that protrude only from an outer peripheral part of a first side surface of the first sheet main body portion and from an outer peripheral part of a second side surface of the first sheet main body, the first side surface and the second side surface extending in a longitudinal direction of the first sheet main body portion, the first supporting pieces being supported by the supporting member; and
the second optical sheet includes:
a second sheet main body portion having a rectangular shape,
a first side surface, the first side surface of the second sheet main body is a continuous flat edge extending in a longitudinal direction of the second sheet main body portion, the longitudinal direction of the second sheet main body being parallel to the longitudinal direction of the first sheet main body, and
second supporting pieces that protrude only from an outer peripheral part of a second side surface of the second sheet main body, the second side surface of the second sheet main body being parallel to the first side surface of the second sheet main body.

2. The display device according to claim 1, further comprising:
a third optical sheet disposed between the second optical sheet and the backlight, wherein the third optical sheet has:
a third sheet main body portion, and
a third supporting pieces that protrude, to a side direction from an outer peripheral part of the third sheet main body portion and is supported by the supporting member while being superimposed on the first supporting pieces.

3. The display device according to claim 2, wherein
each of the first supporting pieces includes a first insertion hole,
each of the second supporting pieces includes a second insertion hole, and
the supporting member has a protrusion inserted into the first insertion hole and the second insertion hole.

4. The display device according to claim 2, wherein a transmittance of the second optical sheet is higher than each of a transmittance of the first optical sheet and a transmittance of the third optical sheet.

5. The display device according to claim 4, wherein
the third optical sheet is a diffuser sheet that diffuses light from the backlight,
the second optical sheet is a prism sheet that collects light diffused by the third optical sheet, and
the first optical sheet is a reflection type polarizing sheet that polarizes light collected by the second optical sheet.

* * * * *